United States Patent [19]

Mawbey et al.

[11] Patent Number: 4,720,146

[45] Date of Patent: Jan. 19, 1988

[54] VEHICLE SEAT HEADREST APPARATUS AND METHOD

[75] Inventors: Gerald W. Mawbey, Rochester; Robert L. Shinaberry, Jr., Birmingham, both of Mich.

[73] Assignee: General Motors Corporation, Detroit, Mich.

[21] Appl. No.: 901,639

[22] Filed: Aug. 28, 1986

[51] Int. Cl.⁴ ........................ B60R 22/28; A47C 1/10
[52] U.S. Cl. .................................... 297/409; 297/284; 297/408; 297/410; 297/DIG. 3; 297/DIG. 8
[58] Field of Search ............... 297/406, 407, 408, 409, 297/410, 284, 391, 216, DIG. 3, DIG. 8

[56] References Cited

U.S. PATENT DOCUMENTS 4,514,010 4/1985 Gonzales ............................ 297/284
4,555,140 11/1985 Nemoto ............................. 297/284

FOREIGN PATENT DOCUMENTS 2222532 11/1973 Fed. Rep. of Germany ...... 297/284
2640163  3/1978 Fed. Rep. of Germany ... 297/DIG. 3

Primary Examiner—James T. McCall
Attorney, Agent, or Firm—Ernest E. Helms

[57] ABSTRACT

The present invention provides an apparatus and method of utilization of the same of a vehicle seat headrest with an adjustable tilt provided by a pneumatic bladder captured between a headrest frame and a pivotally attached cushion support. In an alternative embodiment of the present invention the present invention provides an artificially powered headrest also adjustable in a generally horizontal plane.

12 Claims, 6 Drawing Figures

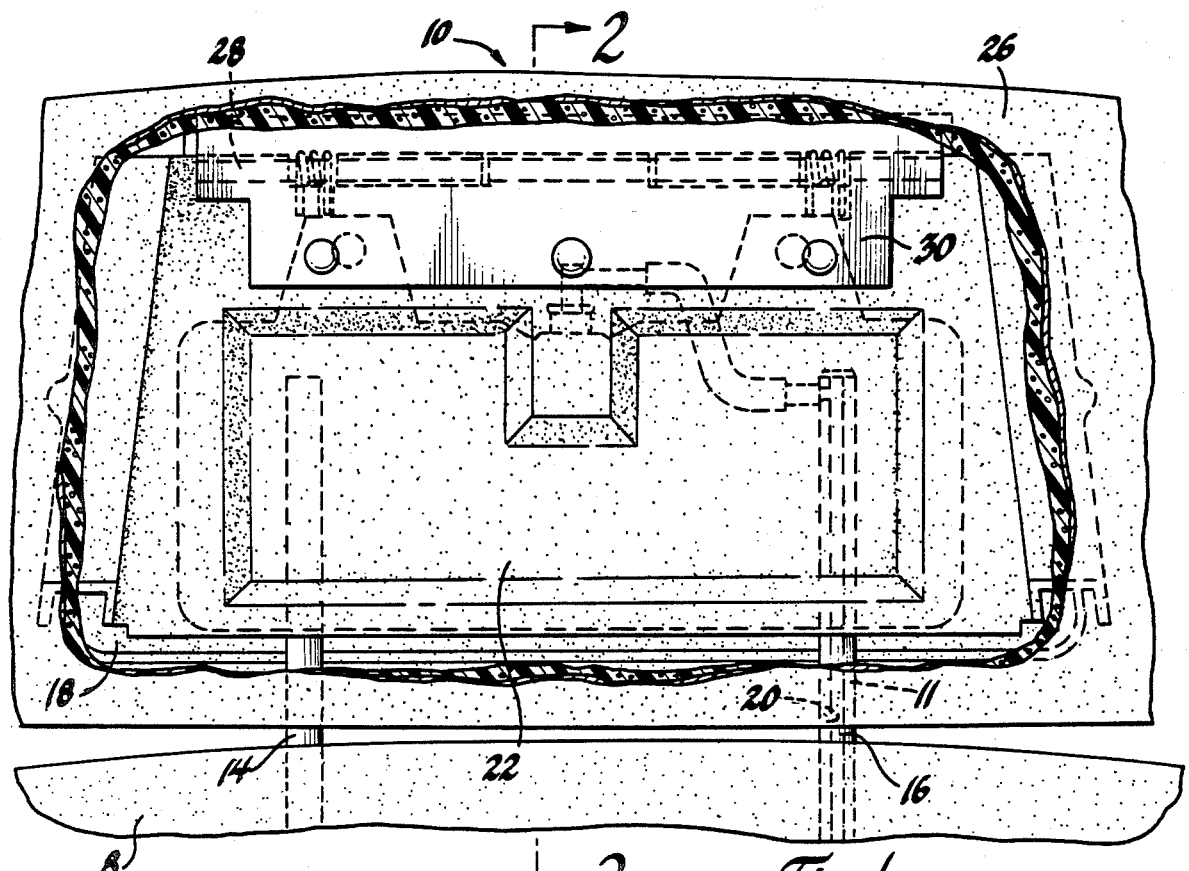
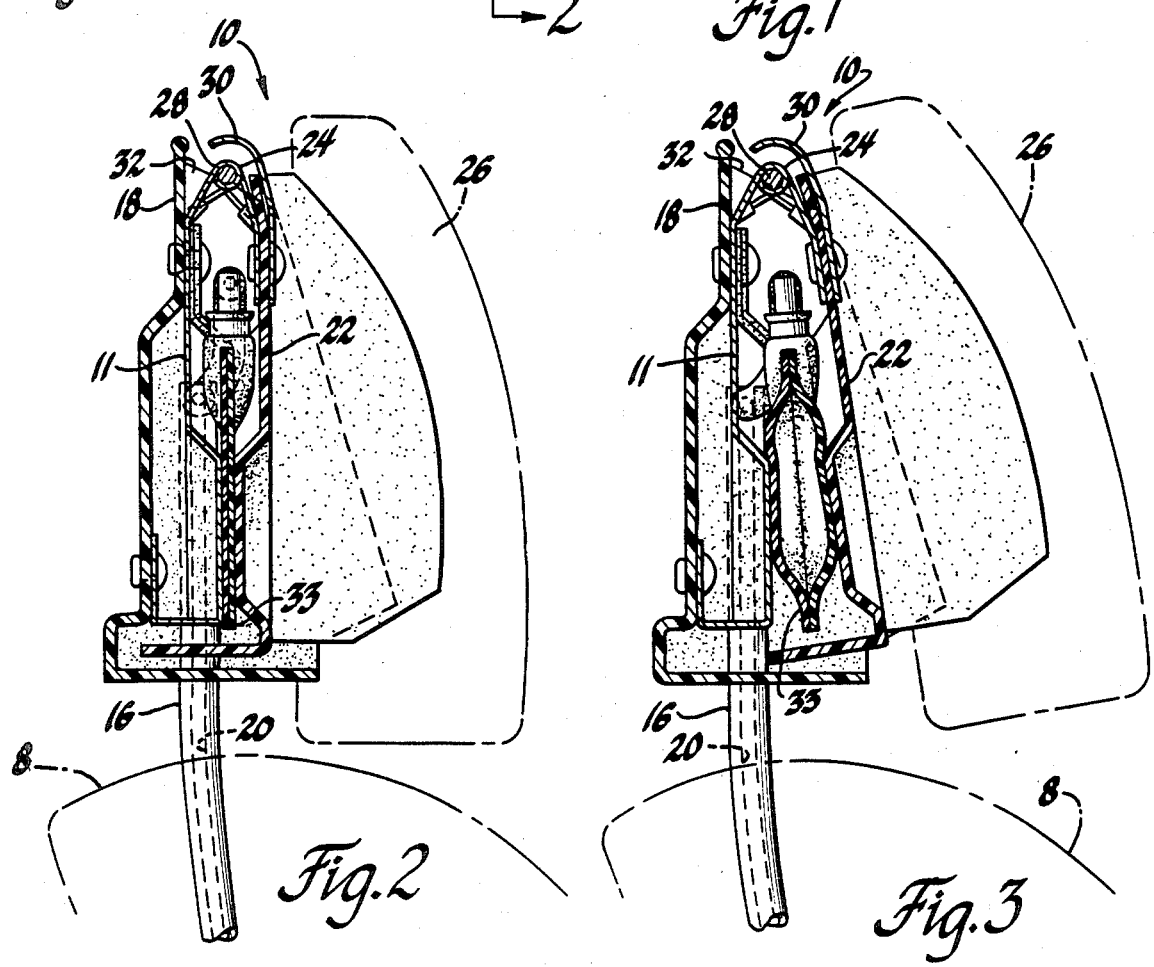
Fig. 1
Fig. 2
Fig. 3

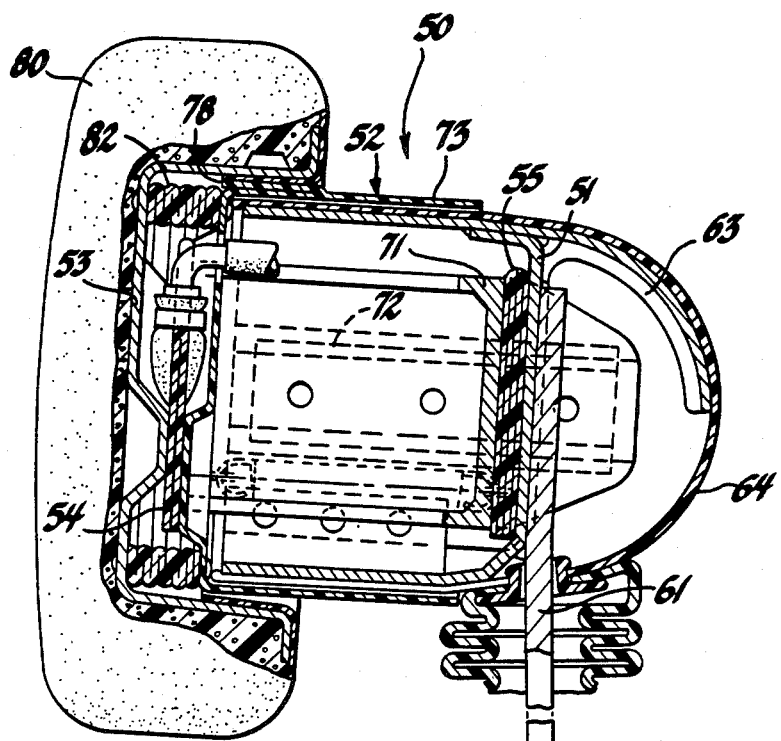
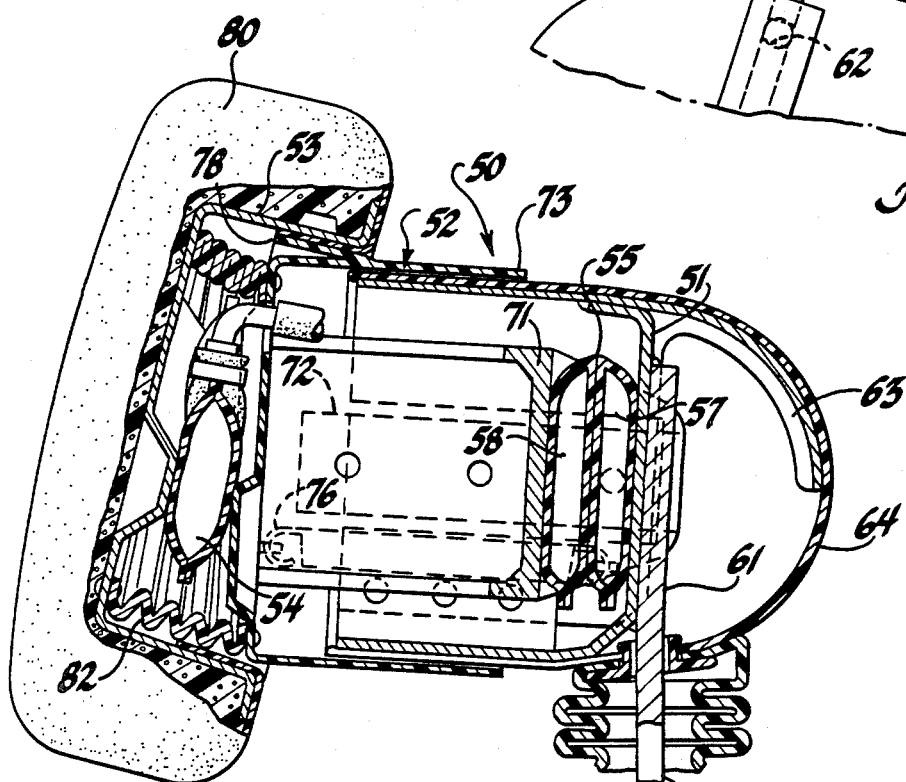

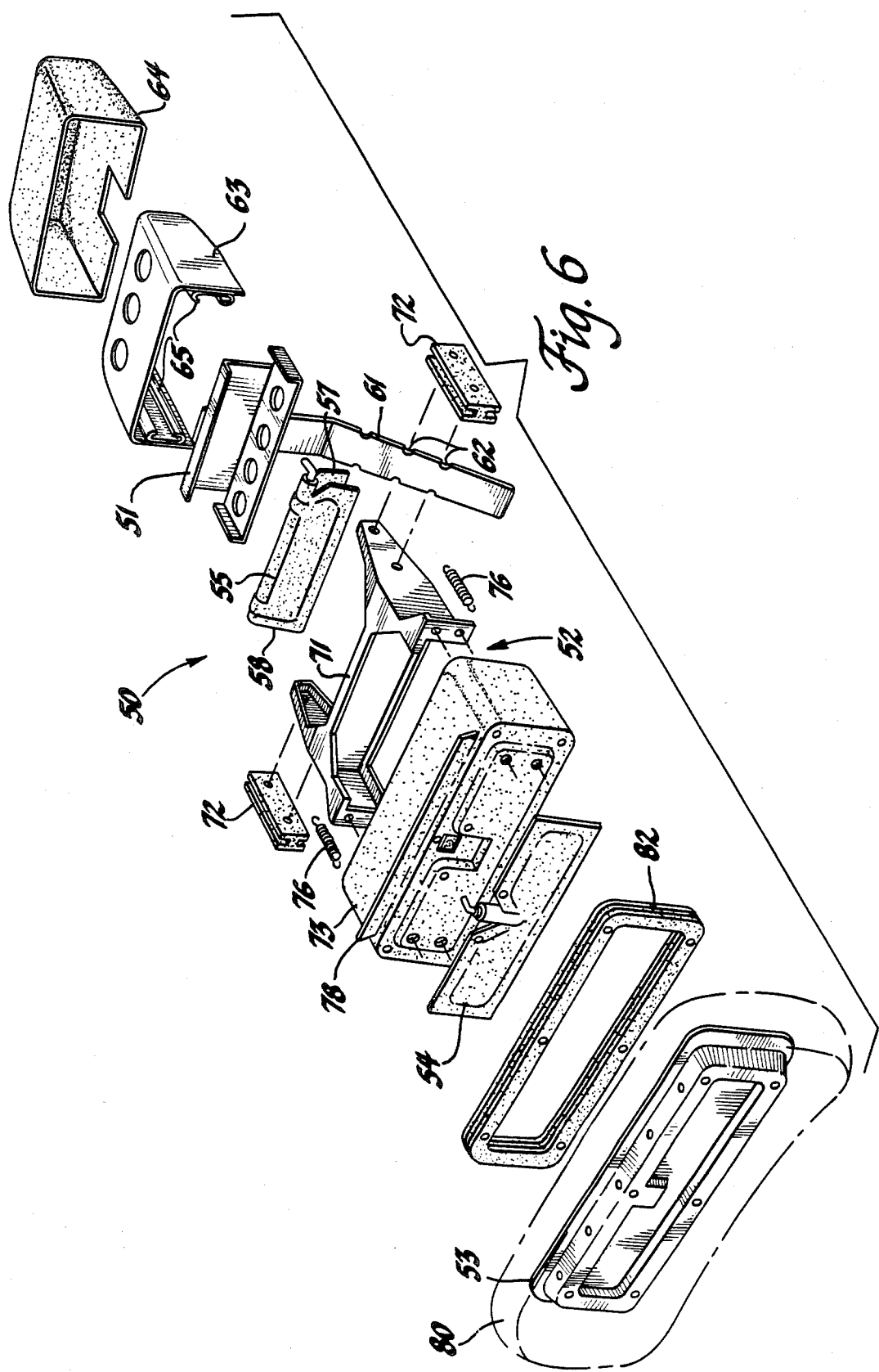

VEHICLE SEAT HEADREST APPARATUS AND METHOD

FIELD OF THE INVENTION

The field of the present invention is that of vehicle seat headrests. More particularly, the field of the present invention is that of vehicle seat headrests wherein the tilt of the headrest is adjustable.

DISCLOSURE STATEMENT

It is well known in the art to provide vehicle seats with headrests. An example of a typical vehicle seat headrest is provided by Leichtl U.S. Pat. No. 3,498,672. Leichtl provides a cushion support surrounded by padding which is connected with the vehicle seat back by a frame post member. The Leichtl head restraint may be vertically adjusted for the various heights of the seat occupants. However, the above adjustment is typically not satisfactory. Since the seat back is generally inclined slightly rearwardly, pulling up on the headrest causes the headrest to be placed in a position horizontally further away from the head of a taller set occupant. Therefore, the headrest does not assume the optimum position required for occupant comfort.

To overcome the problem with the aforementioned patents, Kapanka U.S. Pat. No. 4,113,310 is brought forth. Kapanka utilizes a vehicle seat head restraint which can be pivoted to adjust the tilt of the headrest with respect to the vehicle seat occupant. It is desirable to provide an artificially powered headrest with the tilt capabilities of Kapanka. It is also desirable to provide a vehicle seat headrest whose tilt adjustment mechanism is artificially powered as well as providing artificially powered adjustment in a generally horizontal plane.

SUMMARY OF THE INVENTION

To meet the above-noted and other desires, the present invention is brought forth. The present invention provides a vehicle seat headrest and method of utilization of the same having a frame member for connection to the vehicle seat and a pivotally attached cushion support. Captured between the cushion support and frame is a pneumatic bladder. The pneumatic bladder is selectively inflated to angularly displace the cushion support with respect to the frame.

An alternative preferred embodiment of the present invention provides a vehicle seat headrest further including powered horizontal adjustment.

It is an object of the present invention to provide an apparatus and method of utilization of the same of a vehicle seat headrest which has an adjustable tilt mechanism which utilizes pneumatic power. It is another object of the present invention to provide a vehicle seat headrest as above described also having powered horizontal adjustment.

It is yet another object of the present invention to provide a vehicle seat headrest, the headrest including a frame having a first portion vertically adjustably connected to the vehicle seat and having a second portion slidably connected to the first portion in a generally horizontal plane, a cushion support pivotally connected adjacent an upper end of the cushion support with the frame second portion, a first bladder captured between the cushion support and the second frame portion, the first bladder being selectively inflatable whereby the cushion support is angularly displaced with respect to the first frame portion, and a second bladder captured between the first frame portion and the second frame portion, the second bladder being selectively inflatable whereby the cushion support is linearly displaced with respect to the first frame portion.

It is yet still another object of the present invention to provide a method of adjusting a vehicle seat headrest, the method in combination including connecting a first portion of a frame to the seat and slidably connecting a second portion of the frame to the first portion, pivotally connecting a cushion support with the frame second portion along an upper end of the cushion support, selectively inflating a first pneumatic bladder captured between cushion support and the second frame portion whereby the cushion support is angularly displaced with respect to the first frame portion, and selectively inflating a second pneumatic bladder captured between the frame first and second portions whereby the cushion support is linearly displaced with respect to the first frame portion.

Other objects, desires and advantages of the present invention will become more apparent to those skilled in the art as the nature of the invention is better understood from the accompanying drawings in a detailed description.

BRIEF DESCRIPTION OF THE DRAWINGS

FIG. 1 is a front elevational view of a preferred embodiment headrest of the present invention;

FIG. 2 is a sectional view of the vehicle seat headrest illustrated in FIG. 1 taken along line 2—2;

FIG. 3 is a sectional view of the headrest illustrated in FIG. 1 along line 2—2 with the pneumatic bladder inflated;

FIG. 4 is a side elevational view of a second preferred embodiment of the present invention installed in a vehicle seat;

FIG. 5 is a side elevational view of the vehicle set headrest illustrated in FIG. 4 with the pneumatic bladder inflated; and FIG. 6 is an exploded view of the vehicle seat headrest illustrated in FIG. 4.

DETAILED DESCRIPTION OF THE DRAWINGS

Referring to FIGS. 1 and 2, the headrest 10 of the present invention has three major components. The first component is a frame 11. Pivotally connected with the frame is the second component cushion support 22. Captured between the first two components is the third component, selectively inflatable pneumatic bladder 33.

The frame 11 includes a pair of post supports 14 and 16. The post supports 14 and 16 are vertically adjustable with respect to the seat 8. Fixably connected to post 14 and 16 is an outer panel 18. Post 16 has an air passage fluidly connected with a pneumatic pump or reservoir (not shown) and with the bladder 33. Pivotally connected with the frame 11 adjacent its upper end 24 is the cushion support 22. The cushion support is usually a hard material covered with padding 26. To adjust the tilt of the headrest 10, the pneumatic bladder 33 is selectively inflated. The inflation (FIG. 3) of the pneumatic bladder 33 causes the cushion support 22 to be angularly displaced with respect to the frame 11, pivoting around a hinge pin 28. The cushion support 22 has an extension 30 which in cooperation with the frame member 32 provide a stop means to limit the angular displacement of the cushion support 22 with respect to the frame 11.

A torsion spring encircling the hinge pin 28 angularly bias the cushion support 22 at a predetermined angle (FIG. 2) with respect to the outer panel 18.

Referring to FIGS. 4, 5 and 6, a second preferred embodiment headrest 50 of the present invention has five major components. The first component is a first portion of the frame 51 which is connected with the seat 70. Secondly a second portion of the frame 52 is relatively connected with first frame portion 51. Thirdly, a cushion support 53 connected with the second frame portion 52. The fourth component is a first selectively inflatable pneumatic bladder 54 which provides a first artificial power means to angularly displace the cushion support 53 with respect to the first frame portion 51. The last component is the second selectively inflatable pneumatic bladder 55 which provides the second artificial power means to linearly displace the cushion support 53 with respect to the first frame portion 51.

The first portion 51 includes a generally vertical post 61. Post 61 has a series of notches 62 allowing it to be vertically adjustably inserted into and connected with seat back 70. Seat back 70 typically will include a pawl which will engage with the notches 62. Fixably connected with the post 61 is a rear housing 63 and a textured trim panel 64 which snaps on to the rear housing 63.

Slidably connected with respect to the first frame portion 51 is the second frame portion 52 commonly referred to as the slide assembly. The slide assembly 52 has a main slide frame 71 with attached slides 72 which fit within rails 65 provided in the interior of the rear housing 63. The slide frame 71 is fixably attached to a textured slide trim panel 73. Slide frame 71 is biased by springs 76 to a predetermined (adjacent) position with respect to the first frame portion 51.

The cushion support 53 is covered with padding 80 providing a surface of contact for the vehicle occupant. Along its upper end the cushion support 53 is pivotally connected with the slide assembly 52 via a flange 78 of the slide trim panel 73. A bellows 82 is attached with cushion support 53 and slide trim panel 73 covering first bladder 54 for protection and aesthetics.

The first bladder 54 is captured between the cushion support 53 and the slide assembly 52. Captured between the frame first portion 51 and slide assembly 52 is the second pneumatic bladder 55. The second pneumatic bladder 55 has dual chambers 57 and 58 fluidly connected and folded adjacent one another.

In operation, when it is desired to adjust the cushion support 53 forward, the second pneumatic bladder 55 is selectively inflated (FIG. 5). Springs 76 will return cushion support 53 rearward upon the deflation of second pneumatic bladder 55. When it is desired to adjust the tilt of the headrest, the first pneumatic bladder 54 is selectively inflated (FIG. 5). Bellows 82 with assistance by a return spring (not shown) will return cushion support 53 to its prior position upon deflation of first pneumatic bladder 54.

The present invention provides a method of adjusting a vehicle seat headrest 10, the method including the steps of:

1. Connecting a headrest 10 to a vehicle seat 8.
2. Pivotally connecting a cushion support 22 along its upper end to the frame 11.
3. Selectively inflating a pneumatic bladder 33 between the cushion support 22 and the frame 11 to angularly displace the cushion support 22 with respect to the frame 11.

The present invention also provides a method of adjusting a vehicle seat headrest 50 including:

1. Connecting a first portion of a frame 51 to the seat and slidably connecting a second portion of the frame 52 to the first portion 51.
2. Pivotally connecting along its upper end a cushion support 53 with the frame second portion 52.
3. Inflating a first pneumatic bladder 54 captured between the cushion support 53 and the second frame portion 52 to selectively angularly displace the cushion support 53 with respect to the first frame portion 51.
4. Selectively inflating a second pneumatic bladder 55 captured between the frame first 51 and second portions 52 to linearly displace the cushion support 53 with respect to the first frame portion 51.

While a few of the embodiments of the present invention have been explained, it will be readily apparent to those skilled in the art of the various modifications which can be made to the present invention without departing from the spirit and scope of this application as it is encompassed by the following claims.

The embodiments of the invention in which an exclusive property or privilege is claimed are defined as follows:

1. A vehicle seat headrest, said headrest in combination comprising:
    a frame connected to said vehicle seat;
    a cushion support for providing a surface of contact for a vehicle seat occupant, said cushion support being pivotally connected with said frame adjacent an upper end of said cushion support; and
    a first selectively inflatable pneumatic bladder captured between said cushion support and said frame whereby inflation of said pneumatic bladder causes said cushion support to be angularly displaced with respect to said frame.

2. A vehicle seat headrest as described in claim 1 further including stop means to limit the amount said cushion support is angularly displaced with respect to said frame.

3. A vehicle seat headrest as described in claim 1 further including an air passage within said frame for supplying air to said pneumatic bladder.

4. A vehicle seat headrest, said headrest in combination comprising;
    a frame having tubular air passage and said frame being connected to said vehicle seat;
    a cushion support for providing a surface of contact for a vehicle seat occupant, said cushion support being pivotally connected with said frame adjacent an upper end of said cushion support;
    stop means to limit the amount of said cushion support may be angularly displaced with respect to said frame; and
    a first selectively inflatable pneumatic bladder capture between said cushion support and said frame fluidly connected with said frame air passage whereby inflation of said pneumatic bladder causes said cushion support to be angularly displaced with respect to said frame.

5. A vehicle seat headrest, said headrest in combination comprising;
    a frame having a first portion connected to said seat and a second portion relatively connected with said first portion;
    a cushion support for providing a surface of contact for a vehicle seat occupant, said cushion support being connected with said frame second portion;

first artificial power means whereby said cushion support may be selectively angularly displaced with respect to said first frame portion; and second artificial power means whereby said cushion support may be selectively linearly displaced with respect to said first frame portion.

6. A headrest as described in claim 5 wherein said cushion support is angularly displaced with respect to said frame first portion by a first pneumatic bladder.

7. A headrest as described in claim 5 wherein said cushion support is linearly displaced with respect to said first frame portion by a second pneumatic bladder.

8. A vehicle seat headrest, said headrest in combination comprising:
- a frame having a first portion vertically adjustably connected to said vehicle seat and having as second portion slidably connected to said first portion in a generally horizontal plane;
- a cushion support pivotally connected adjacent an upper end of said cushion support with said frame second portion;
- a first bladder captured between said cushion support and said second frame portion, said first bladder being selectively inflatable whereby said cushion support is angularly displaced with respect to said first frame portion; and
- a second bladder captured between said first frame portion and said second frame portion, said second bladder being selectively inflatable whereby said cushion support is linearly displaced with respect to said first frame portion.

9. A headrest as described in claim 8 wherein said second bladder has dual chambers fluidly connected.

10. A headrest as described in claim 8 wherein said second frame portion is spring biased to a predetermined position with respect to said first frame portion.

11. A method of adjusting a vehicle seat headrest, said method in combination comprising:
- connecting a frame to a vehicle seat;
- pivotally connecting a cushion support to said frame adjacent an upper end of said cushion support to provide a surface of contact for a vehicle seat occupant; and
- selective inflating a pneumatic bladder captured between said cushion support and said frame whereby said cushion support is angularly displaced with respect to said frame.

12. A method of adjusting a vehicle seat headrest, said method in combination comprising:
- connecting a first portion of a frame to said seat and slidably connecting a second portion of said frame to said first portion;
- pivotally connecting a cushion support with said frame second portion along an upper end of said cushion support to provide a surface of contact for a vehicle seat occupant;
- selectively inflating a first pneumatic bladder captured between said cushion support and said second frame portion whereby said cushion support is angularly displaced with respect to said first frame portion; and
- selectively inflating a second pneumatic bladder captured between said frame first and second portions whereby said cushion support is linearly displaced with respect to said first frame portion.

* * * * *